(12) United States Patent
Lim et al.

(10) Patent No.: US 10,867,372 B2
(45) Date of Patent: Dec. 15, 2020

(54) ELECTRONIC DEVICE AND METHOD FOR CORRECTING IMAGES BASED ON IMAGE FEATURE INFORMATION AND IMAGE CORRECTION SCHEME

(71) Applicant: Samsung Electronics Co., Ltd., Gyeonggi-do (KR)

(72) Inventors: Sungjun Lim, Gyeonggi-do (KR); Hyunhee Park, Gyeonggi-do (KR); Changsu Han, Gyeonggi-do (KR); Youngjo Kim, Gyeonggi-do (KR); Jaegon Kim, Gyeonggi-do (KR); Hongseok Yang, Gyeonggi-do (KR); Kwangtai Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 157 days.

(21) Appl. No.: 16/250,033

(22) Filed: Jan. 17, 2019

(65) Prior Publication Data

US 2019/0272625 A1   Sep. 5, 2019

(30) Foreign Application Priority Data

Mar. 5, 2018   (KR) .................. 10-2018-0025836

(51) Int. Cl.
*G06T 5/00* (2006.01)
*G06K 9/62* (2006.01)
*G06K 9/00* (2006.01)

(52) U.S. Cl.
CPC .......... *G06T 5/007* (2013.01); *G06K 9/00624* (2013.01); *G06K 9/6201* (2013.01); *G06K 9/6267* (2013.01)

(58) Field of Classification Search
CPC ........... G06T 5/007; G06T 5/00; G06T 5/001; G06T 5/002; G06T 5/003; G06T 5/004;
(Continued)

(56) References Cited

U.S. PATENT DOCUMENTS 7,079,702 B2 * 7/2006 Watanabe ............... G06T 5/008
                                                          348/251
7,181,091 B2 * 2/2007 Yoda ......................... G06T 5/00
                                                          348/251
(Continued)

FOREIGN PATENT DOCUMENTS

KR   10-2004-0017604 A   2/2004
KR      10-1191172 B1   10/2012
WO      2015/073935 A1    5/2015

OTHER PUBLICATIONS

International Search Report dated Apr. 18, 2019.

*Primary Examiner* — Manav Seth
(74) *Attorney, Agent, or Firm* — Cha & Reiter, LLC.

(57) ABSTRACT

An electronic device according to embodiments may include: a communication module; a first processor configured to correct images, and a second processor operatively connected to the communication module and the first processor. The second processor is configured to control the first processor to correct a first image set obtained from a database, select at least one image from the first image set based at least on a correction result of the first image set, and transmit feature information on the selected at least one image to the first processor. The first processor is configured to obtain a second image set from the database based on the feature information, and generate a third image set by correcting the second image set. Various other embodiments may be possible.

20 Claims, 8 Drawing Sheets

(58) Field of Classification Search
CPC ......... G06T 5/005; G06T 5/006; G06T 5/008;
G06T 2207/20182; G06T 2207/20192;
G06T 2207/20201; G06T 2207/20204;
G06T 2207/20208; G06K 9/00624; G06K
9/6201; G06K 9/6267; G06K 9/0063;
G06K 9/00677; G06K 9/00744; G06K
9/00087; G06K 9/00187; G06K 9/00268;
G06K 9/00275; G06K 9/00281
See application file for complete search history.

(56) References Cited

U.S. PATENT DOCUMENTS

| | | | | |
|---|---|---|---|---|
| 7,596,273 | B2* | 9/2009 | Aoyama | G06T 7/12 |
| | | | | 358/3.26 |
| 8,054,374 | B2* | 11/2011 | Chou | H04N 5/2354 |
| | | | | 348/362 |
| 8,237,119 | B2* | 8/2012 | Nakahira | H01J 37/222 |
| | | | | 250/307 |
| 8,666,148 | B2* | 3/2014 | Paris | G06K 9/62 |
| | | | | 382/155 |
| 8,712,096 | B2* | 4/2014 | Xiao | G06T 7/254 |
| | | | | 382/103 |
| 9,008,415 | B2* | 4/2015 | Paris | G06K 9/00275 |
| | | | | 382/159 |
| 9,036,943 | B1* | 5/2015 | Baldwin | G06K 9/00664 |
| | | | | 382/284 |
| 9,330,300 | B1* | 5/2016 | Palmer, III | G06K 9/00261 |
| 9,536,285 | B2* | 1/2017 | Wang | H04N 1/00167 |
| 9,589,334 | B2* | 3/2017 | Swanson | G06T 5/009 |
| 10,043,239 | B2* | 8/2018 | Johannesson | G06T 3/4061 |
| 10,127,662 | B1* | 11/2018 | Reicher | G06T 7/30 |
| 10,628,708 | B2* | 4/2020 | Lin | G06K 9/00624 |
| 2004/0037451 | A1 | 2/2004 | Kim et al. | |
| 2004/0150726 | A1 | 8/2004 | Gallagher | |
| 2012/0219218 | A1* | 8/2012 | Demandolx | G06T 5/40 |
| | | | | 382/168 |
| 2013/0315476 | A1 | 11/2013 | Paris et al. | |
| 2014/0010448 | A1* | 1/2014 | Lischinski | G06T 5/005 |
| | | | | 382/167 |
| 2014/0093184 | A1* | 4/2014 | Wang | H04N 1/00167 |
| | | | | 382/254 |
| 2014/0136566 | A1 | 5/2014 | Kim et al. | |
| 2015/0142732 | A1 | 5/2015 | Pace et al. | |

\* cited by examiner

ELECTRONIC DEVICE AND METHOD FOR CORRECTING IMAGES BASED ON IMAGE FEATURE INFORMATION AND IMAGE CORRECTION SCHEME

CROSS-REFERENCE TO RELATED APPLICATION(S)

This application is based on and claims priority under 35 U.S.C. § 119 to Korean Patent Application No. 10-2018-0025836, filed on Mar. 5, 2018, in the Korean Intellectual Property Office, the disclosure of which is incorporated by reference herein in its entirety.

BACKGROUND

1) Field

The disclosure generally relates to an image correction device and, more particularly, to an electronic device configured to selectively correct images and the operations thereof.

2) Description of Related Art

The above information is presented as background information only to assist with an understanding of the present disclosure. No determination has been made, and no assertion is made, as to whether any of the above might be applicable as prior art with regard to the present disclosure.

An electronic device may correct a raw image obtained by an image sensor using an image signal processor (ISP). The image signal processor may correct the raw image by employing an image-quality improvement algorithm, thereby providing an image of improved quality. The image may be compressed, for example, in the JPEG format, and may be stored in the electronic device.

SUMMARY

The ISP may include both hardware and software components, and the software may be upgradeable using over-the-air updates. The electronic device may correct a plurality of images stored in a database by using the upgraded ISP. However, it may be inefficient to update all of the images in the database. For example, some images may have noticeable increases in brightness when they are corrected using the updated ISP, whereas others may not have such noticeable increases in brightness. It may be a waste of time and resources (e.g., power) to correct images with the updated ISP when such update would not result in noticeable improvements.

Embodiments of the disclosure may provide an electronic device configured to find and correct images that are expected to have noticeable improvements, and may further provide a method for the operations thereof.

According to embodiments, an electronic device may include: a communication module; a memory; and a processor, wherein the processor is configured to: identify a database that stores a plurality of raw images received from an external device, the database including a plurality of category information stored in association with at least some of the plurality of raw images and determined based on image recognition of the at least some of the plurality of raw images; identify a change, at least in part, in an image correction scheme of the electronic device; obtain a first raw-image set from among the plurality of raw images, from the database; correct a first raw image in the first raw-image set based on a first image correction scheme to which the change has not been applied; correct the first raw image based on a second image correction scheme to which the change has been applied; determine whether a difference between data obtained by correcting the first raw image based on the first image correction scheme and data obtained by correcting the first raw image based on the second image correction scheme satisfies a specified condition; identify category information corresponding to the first raw image based on determining that the difference satisfies the condition; obtain a second raw-image set from among the plurality of raw images, from the database, based on the category information; and correct the second raw-image set based on the second image correction scheme to generate a third raw-image set.

According to embodiments of the disclosure, an electronic device may include: a communication module; a first processor configured to correct images; and a second processor operatively connected to the communication module and the first processor, wherein the second processor is configured to: control the first processor to correct a first image set obtained from a database; select at least one image from the first image set based at least on a correction result of the first image set; and transmit feature information on the selected at least one image to the first processor, and wherein the first processor is configured to: obtain a second image set from the database based on the feature information; and generate a third image set by correcting the second image set.

According to embodiments of the disclosure, a method for operating an electronic device may include: identifying a database that stores a plurality of raw images received from an external device, the database including a plurality of category information stored in association with at least some of the plurality of raw images and determined based on image recognition of the at least some of the plurality of raw images; identifying a change, at least in part, in an image correction scheme of the electronic device; obtaining a first raw-image set from among the plurality of raw images, from the database; correcting a first raw image in the first raw-image set based on a first image correction scheme to which the change has not been applied; correcting the first raw image based on a second image correction scheme to which the change has been applied; determining whether a difference between data obtained by correcting the first raw image based on the first image correction scheme and data obtained by correcting the first raw image based on the second image correction scheme satisfies a specified condition; identifying category information corresponding to the first raw image based on determining that the difference satisfies the condition; obtaining a second raw-image set from among the plurality of raw images, from the database, based on the category information; and correcting the second raw-image set based on the second image correction scheme to generate a third raw-image set.

According to embodiments of the disclosure, the electronic device can efficiently use its resources and time by selectively correcting images.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
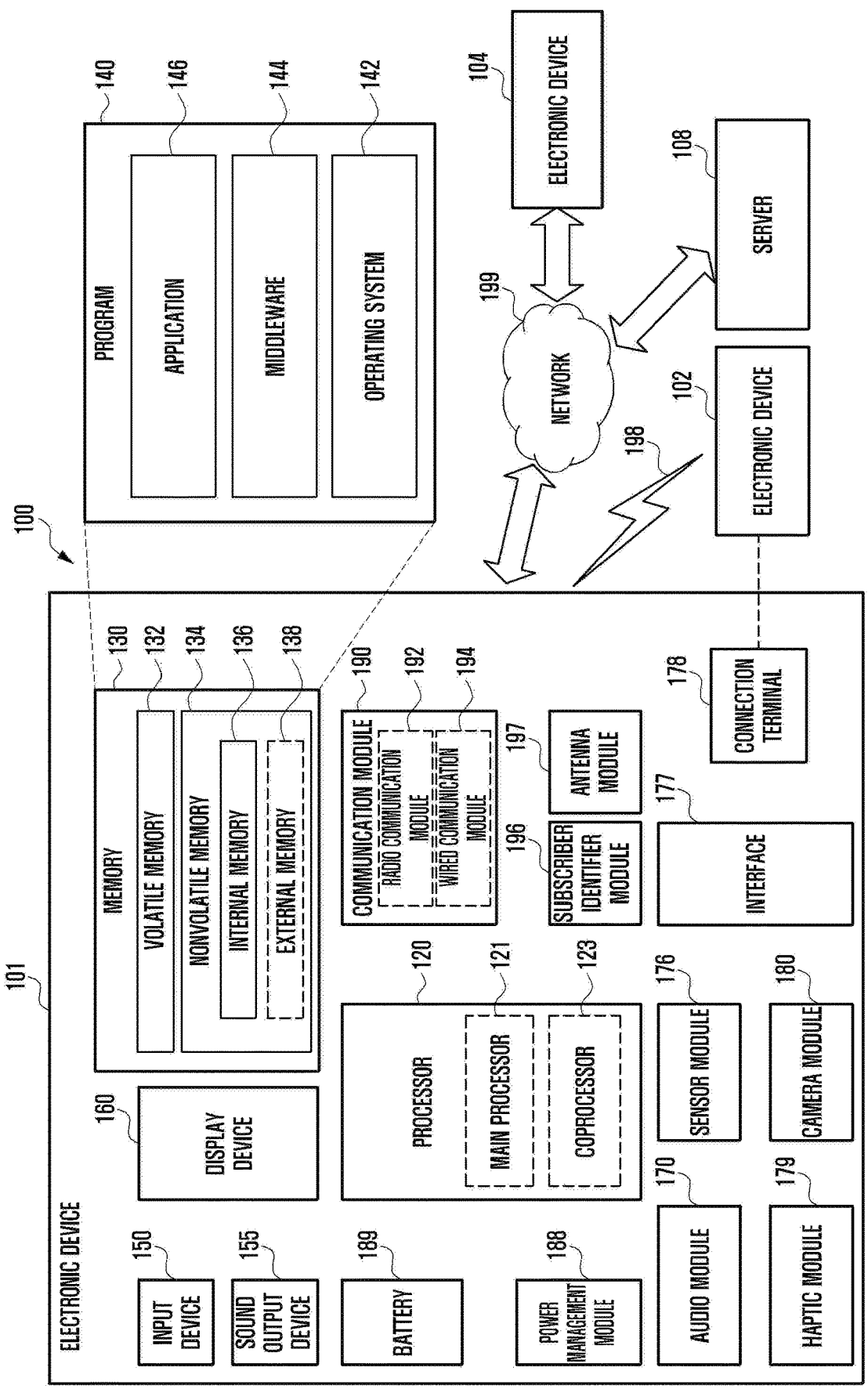
FIG. 1 illustrates an electronic device in a network environment in embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
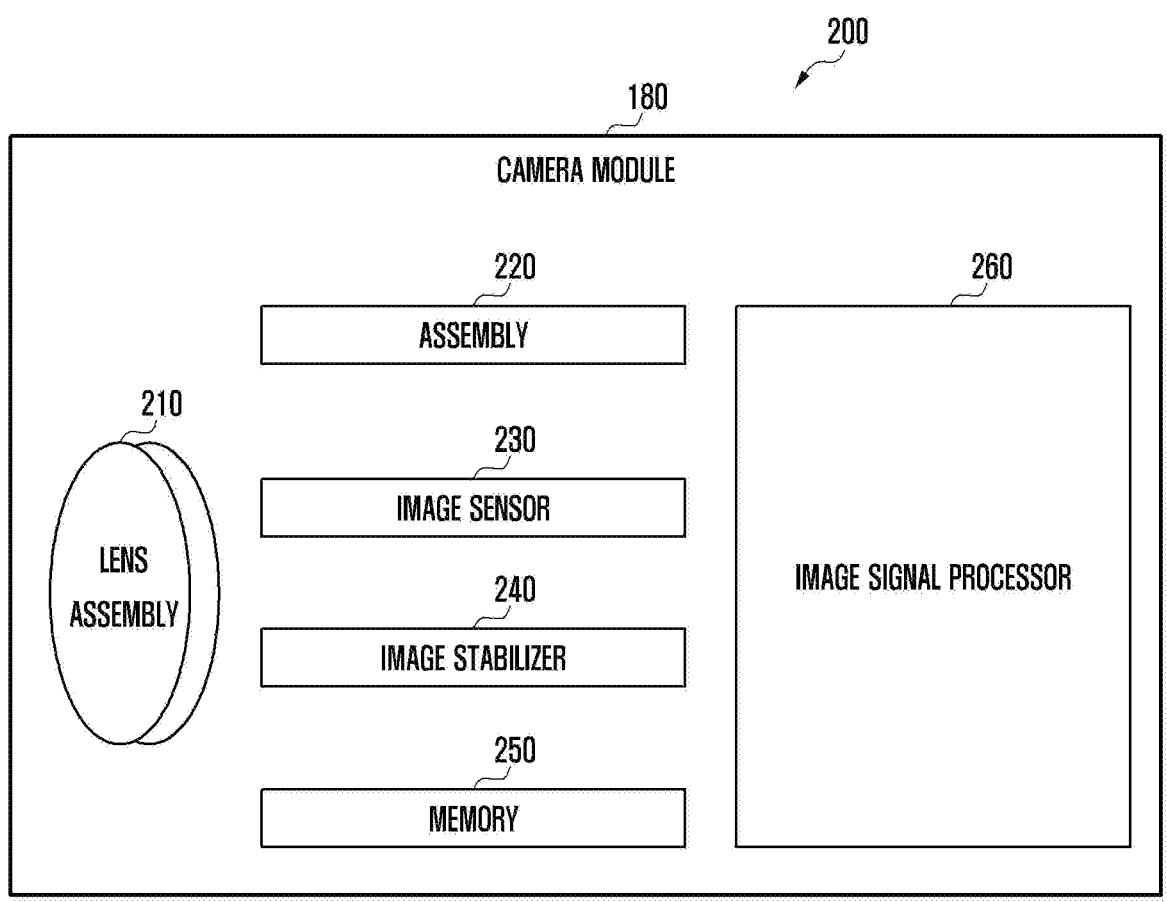
FIG. 2 is a block diagram of a camera module according to an embodiment.

FIG. 2 is a block diagram 200 illustrating the camera module 180 according to an embodiment. Referring to FIG. 2, the camera module 180 may include a lens assembly 210, a flash 220, an image sensor 230, an image stabilizer 240, memory 250 (e.g., buffer memory), and/or an image signal processor 260. The lens assembly 210 may collect light emitted or reflected from an object whose image is to be taken (hereinafter may be referred to simply as "the object"). The lens assembly 210 may include one or more lenses.

According to an embodiment, the camera module 180 may include a plurality of lens assemblies 210. In such a case, the camera module 180 may be, for example, a dual camera, a 360-degree camera, a spherical camera, etc. Some of the plurality of lens assemblies 210 may have the same lens attribute (e.g., view angle, focal length, auto-focusing, f number, or optical zoom), or at least one lens assembly may have one or more lens attributes different from those of other lens assemblies. The lens assembly 210 may include, for example, a wide-angle lens or a telephoto lens.

The flash 220 may emit light that is used to reinforce the light reflected from the object. According to an embodiment, the flash 220 may include one or more light emitting diodes (LEDs) (e.g., red-green-blue (RGB) LED, white LED, infrared (IR) LED, or ultraviolet (UV) LED) or a xenon lamp. The image sensor 230 may obtain an image corresponding to the object by converting light emitted or reflected from the object and transmitted via the lens assembly 210 into an electrical signal. According to an embodiment, the image sensor 230 may include one of a RGB sensor, a black-and-white (BW) sensor, an IR sensor, or a UV sensor. Alternatively, the image sensor 230 may include a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This compensates for one or more negative effects (e.g., image blurring) caused by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for subsequent image processing. For example, if image capturing is delayed due to shutter lag or multiple images are quickly captured, raw images obtained, such as Bayer-patterned images or high-resolution images, may be stored in the memory 250, and their corresponding copy images such as the corresponding low-resolution images may be previewed via the display device 160. Thereafter, if a specified condition is met (e.g., when a user's input is detected or system command is issued), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to images obtained via the image sensor 230 or images stored in the memory 250. The one or more image processing may include, for example, depth map generation, three-dimensional (3D) modeling, panorama generation, feature point extraction, image synthesizing, image compensation (e.g., noise reduction, resolution adjustment, brightness adjustment, blurring, sharpening, or softening), etc. Additionally or alternatively, the image signal processor 260 may control at least one of the components included in the camera module 180 (e.g., the image sensor 230). For example, the image signal processor 260 may control the exposure timing or read-out timing of the image sensor 230. Images processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is being processed or after it is processed.

According to an embodiment, the electronic device 101 may include a plurality of camera modules 180 having different attributes or functions. In such a case, at least one of the plurality of camera modules 180 may be, for example, a wide-angle camera and at least another of the plurality of camera modules 180 may be a telephoto camera. Similarly, at least one of the plurality of camera modules 180 may be, for example, a front camera and at least another of the plurality of camera modules 180 may be a rear camera.

Figure 3:
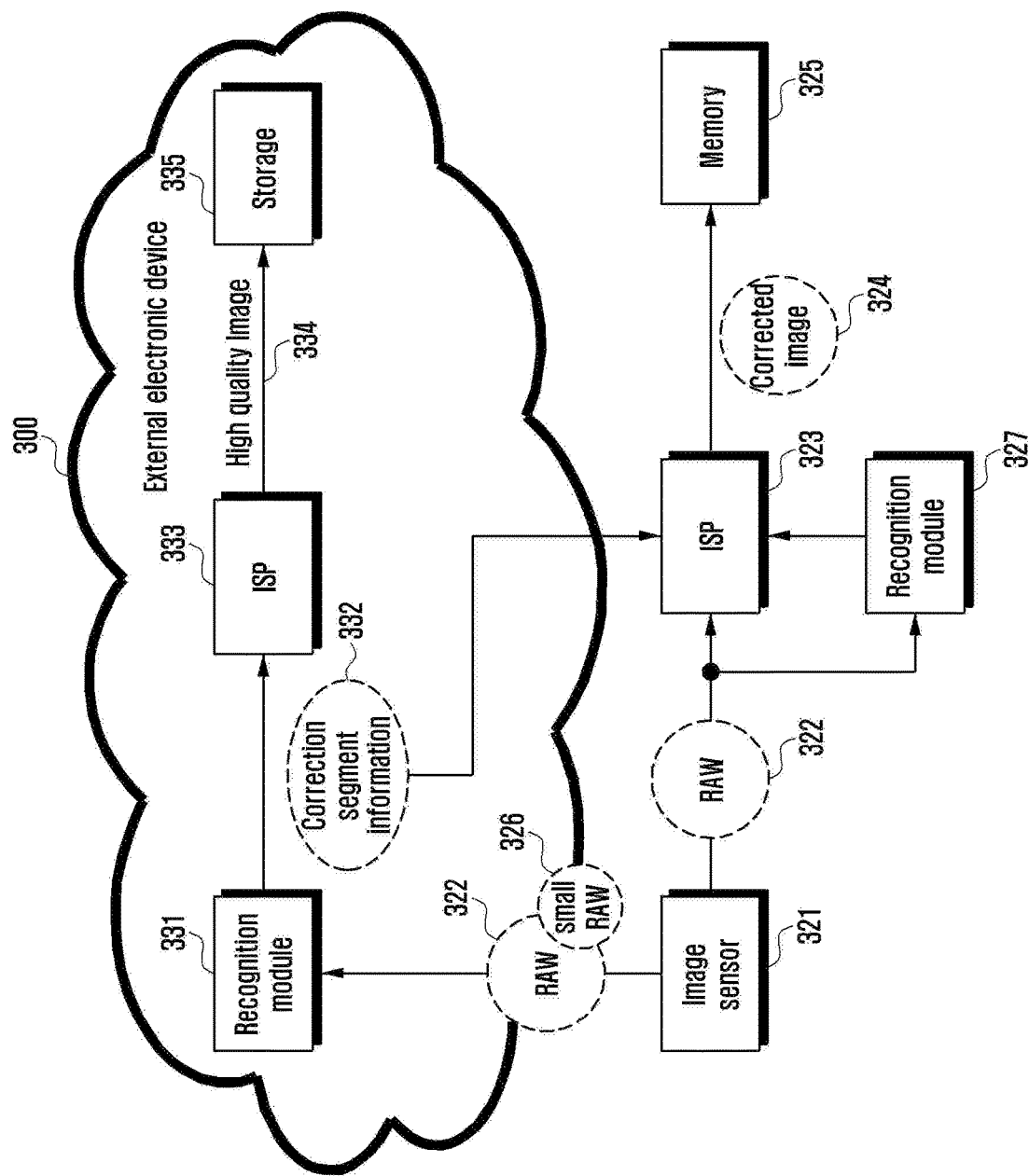
FIG. 3 is a conceptual diagram illustrating operations of an electronic device and an external electronic device according to an embodiment.

FIG. 3 is a conceptual diagram illustrating operations of an electronic device and an external electronic device according to an embodiment.

In an embodiment, an electronic device 101 may include an image sensor 321, an image signal processor (ISP) 323, and a memory 325. An external electronic device 300 (e.g., the electronic device 104 or the server 108) may include a recognition module 331, an ISP 333, and a storage 335 (e.g. another memory). The recognition module 331 may be a logical module, or may be implemented as a processor of the external electronic device 300. The ISP 333 may also be implemented as a processor of the external electronic device 300. For example, the processor of the external electronic device 300 may perform both recognition and image processing. Although it is not shown in the figure, the electronic device 101 may include a communication module (e.g., the communication module 190 in FIG. 1) capable of transmitting and receiving data to and from the external electronic device 300. The external electronic device 300 may in turn include a communication module capable of transmitting and receiving data to and from the electronic device 101. According to some embodiments, a recognition module 327 may be included in the electronic device 101. The recognition module 327 of the electronic device 101 may be configured to perform at least some of the functions of the recognition module 331. For example, the recognition module 327 may be hardware configured to recognize a face in an image captured by the image sensor 321. Because the recognition module 327 is part of the electronic device 101, it may recognize the face more quickly than if the electronic device 101 were to employ the recognition module 331 of the external electronic device 300 (e.g., the server).

In an embodiment, the image sensor 321 (e.g., the image sensor 230 in FIG. 2) may obtain an image of an external object, and may generate a raw image 322 corresponding thereto. The raw image 322 may be implemented in various formats such as Bayer format, a format processed by a color filter array (CFA) pattern, a format in a layer structure generated by sensing all three colors of pixels of the image, a format generated by obtaining different time information from each pixel of the image, etc. The image sensor 321 may transmit the raw image 322 to the ISP 323 (e.g., the image signal processor 260 in FIG. 2) and/or the recognition module 327.

In an embodiment, the image sensor 321 may generate a small-raw image 326. The image sensor 321 may generate the small-raw image 326 by reducing the size of the raw image 322. For example, the image sensor 321 may generate the small-raw image 326 from the raw image 322 using various down-scale schemes or down-sampling schemes. These schemes include adjusting the resolution of the raw image 322, selecting at least some of the frequency bands of the raw image 322, selecting at least one of the bit plane levels of the raw image 322. The image sensor 321 may transmit the small-raw image 326 to the external electronic device 300 through a communication module of the electronic device 101. Thus, the small-raw image 326 may contain at least some of the information on the raw image 322, but may be smaller in size as compared to the raw image 322. If the small-raw image 326 is transmitted to the external electronic device instead of the raw image 322, the image can be transmitted to the external electronic device 400 faster because the transmitted image is smaller in size. In another embodiment, a processor (e.g., the processor 120) of the electronic device 101, instead of the image sensor 321, may generate the small-raw image 326, and the generated small-raw image 326 may be transmitted to the external electronic device 300 via the communication module. The processor of the electronic device 101 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

In an embodiment, the image sensor 321 may compress the raw image 322 and transmit the compressed raw image 322 to the ISP 323, the external electronic device 300, or the recognition module 327. The image sensor 321 may compress the raw image 322, and may store the same in an internal memory thereof for partial processing.

In an embodiment, the recognition module 331 of the external electronic device 300 may obtain the small-raw image 326 via the communication module, and may segment at least one image segment from the small-raw image 326. The recognition module 331 may recognize each of one or more image segments separated from the small-raw image 326. For example, the recognition module 331 may perform segmentation processing with respect to the small-raw image 326, and may identify at least one image segment from the small-raw image 326 from the segmentation processing. The recognition module 331 may also recognize at least one image segment by applying an object recognition algorithm or a texture recognition algorithm to the image segments. The recognition module 331 of the external electronic device 300 may recognize at least one image segment using various recognition algorithms, and may identify at least one image segment using a recognition algorithm obtained through machine learning or deep learning. For example, as a result of a particular recognition, the recognition module 331 of the external electronic device 300 may determine that the pixel coordinates (100, 101), (100, 102), (102, 102), and (102, 103) in the small-raw image 326 indicate human teeth. Here, the pixel coordinates may also correspond to the pixel coordinates of the raw image 322. The recognition module 331 may obtain classification information stating that, for example, the small-raw image 326 is categorized as "people who are located on streets." The recognition module 331 may obtain the classification information using the recognition results. Alternatively, the recognition module 331 may obtain the classification information using color distribution in the small-raw image 326 without performing recognition processing. The recognition module 331 may generate correction segment information 332, which includes at least one piece of information related to at least one image segment obtained through above-described process. The correction segment information 332 may further include the classification information. The recognition module 331 may transmit the correction segment information 332 to the electronic device 101. The ISP 323 may correct the raw image 322 using the correction segment information 332, thereby generating a corrected image 324. The corrected image 324 may have, for example, a YUV format. The corrected image 324 may be stored in the memory 325. Alternatively, the corrected image 324 may be compressed, for example, in the JPEG format, so that the compressed image may be stored in the memory 325. According to some embodiments, the correction segment information 332 may be alternatively generated by the recognition module 327 of the electronic device 101 to then be transmitted to the ISP 323.

In an embodiment, the raw image 322 provided by the image sensor 321 may be transmitted to the external electronic device 300 in addition to the small-raw image 326. The external electronic device 300 may generate another correction segment information using the raw image 322. The external electronic device 300 (e.g., the ISP 333 of the external electronic device 300) may use the raw image 322, which is larger in size than the small-raw image 326, and generate another correction segment information different from the correction segment information generated using the small-raw image 326. The correction segment information generated from the raw image 322 may be referred to as "extended correction segment information." Since the raw image 322 generally includes more information than the small-raw image 326, the external electronic device 300 may generate more detailed correction segment information. In an embodiment, the external electronic device 300 (e.g., the ISP 333 of the external electronic device 300) may generate the extended correction segment information directly from the raw image 322. Alternatively, the external electronic device 300 (e.g., the ISP 333 of the external electronic device 300) may generate the extended correction segment information using the existing correction segment information, which has been generated using the small-raw image 326, and the raw image 322.

In an embodiment, since the size of the raw image 322 is larger than that of the small-raw image 326, the small-raw image 326 may be first transmitted to the external electronic device 300, and then the raw image 322 may be transmitted to the external electronic device 300. For example, the raw image 322 may be transmitted to the external electronic device 300 while the ISP 323 performs correction with respect to the raw image 322 using the correction segment information 332 generated from the small-raw image 326. The raw image 322 may be uploaded to the external electronic device 300 as it is being generated by the image sensor 321, or a preprocessed image that has been processed with lens distortion correction or noise removal may be uploaded to the external electronic device 300 after the preprocessing is complete. In the case where the raw image 322 is uploaded to the external electronic device 300 as it is being generated by the image sensor 321, the preprocessing may be performed by the external electronic device 300. In addition, the external electronic device 300 may perform de-mosaic processing, image format modification, or other preprocessing on the raw image 322 to increase the image recognition rate. The ISP 333 of the external electronic device 300 may correct the received raw image 322. The external electronic device 300 may correct the raw image 322 using the correction segment information 332 that has been previously generated, or may correct the raw image 322 using the extended correction segment information. The raw image 322 may have higher resolution than the small-raw image 326, so that the ISP 333 of the external electronic device 300 may obtain more detailed extended correction segment information from the higher quality raw image 322. The ISP 333 may generate the extended correction segment information using both the previously generated correction segment information and the raw image 322. The ISP 333 may correct the raw image 322 using the extended correction segment information, thereby obtaining a high quality image 334. The high quality image 334 may be stored in the storage 335 of the external electronic device 300, and may be transmitted to the electronic device 101.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 4:
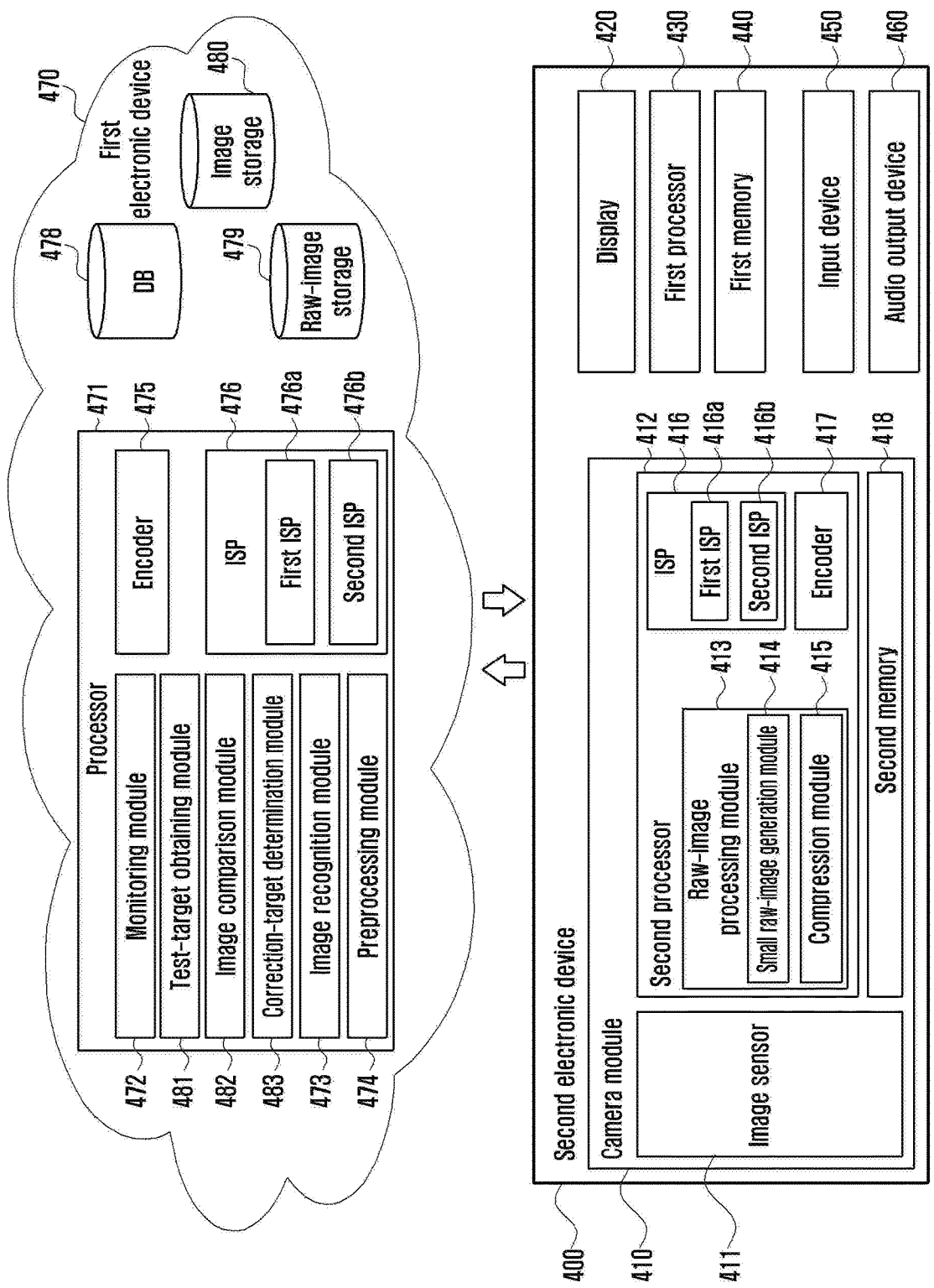
FIG. 4 is a block diagram of electronic devices according to an embodiment.

FIG. 4 is a block diagram of electronic devices according to an embodiment.

According to an embodiment, a first electronic device 470 (e.g., the electronic device 102 or the server 108) may be implemented as a cloud server. The first electronic device 470 may play the role of network management between servers constituting the cloud system and electronic devices (e.g., a second electronic device 400) connectable to the cloud system, cloud service management in relation to provided services and authorities, storage management, and the like.

According to an embodiment, the first electronic device 470 may include a processor 471, a database 478, a raw-image storage 479, and an image storage 480. According to embodiments, the processor 471 may include a preprocessing module 474, an image recognition module 473, an ISP 476, an encoder 475, a monitoring module 472, a test-target obtaining module 481, an image comparison module 482, and a correction-target determination module 483. According to some embodiments, the ISP 476 may be configured as separate hardware.

According to an embodiment, the preprocessing module 474, the image recognition module 473, the encoder 475, the monitoring module 472, the test-target obtaining module 481, the image comparison module 482, and the correction-target determination module 483 may be logical modules, and thus the operations thereof may be performed by the processor 471 or a processor (a first processor 430 or a second processor 412) of the second electronic device 400.

According to an embodiment, at least one of the preprocessing module 474, the image recognition module 473, the ISP 476, the encoder 475, the monitoring module 472, the test-target obtaining module 481, the image comparison module 482, or the correction-target determination module 483 may be implemented as self-contained hardware inside the processor 471 of the first electronic device 470 or as self-contained hardware inside the processor (e.g., the first processor 430 or the second processor 412) of the second electronic device 400.

According to an embodiment, the preprocessing module 474 may preprocess an image (e.g., the raw image or the small-raw image) received from the second electronic device 400, and may transmit the preprocessed image to the image recognition module 473, the raw-image storage 479, or the ISP 476. According to some embodiments, the preprocessing may include decoding the image file received from the second electronic device 400, thereby obtaining the raw image. For example, the image received from the second electronic device 400 may be encoded in a specific format such as JPEG. In such a case, the preprocessing module 474 may first decode the image.

According to an embodiment, the image recognition module 473 (e.g., the recognition module 331 in FIG. 3) may receive, from the second electronic device 400, the image (e.g., the raw image or the small-raw image) via the communication module of the first electronic device 470 or via the preprocessing module 474.

According to an embodiment, the image recognition module 473 may recognize the received image using various algorithms. These algorithms may include (1) object recognition algorithm, (2) texture recognition algorithm, (3) recognition algorithm obtained by applying machine learning or deep learning to images stored in the image storage 480 or the raw-image storage 479, etc. The image recognition module 473 may then store the recognition result in a database (e.g., the raw-image storage 479) so the recognition result is associated with the received image. Alternatively or in addition, the recognition result may be transmitted to the second electronic device 400. For example, the image recognition module 473 may recognize at least one object (e.g., person, sky, cloud, cat, dog, etc.) from the received image. Here, the object may be recognized from an image segment in the image. According to some embodiments, the image recognition module 473 may perform object recognition in the image on the basis of user information. For example, the user information may be obtained from the images (e.g., photographs of families and relatives, photographs of residential houses, etc.) stored in the database 478. The recognition result may include location information (e.g., pixel coordinates) on an image segment and identification information of the object related to the image segment, and may be used when the ISP 476 processes the image and when the test-target obtaining module 481 selects a test target.

According to an embodiment, the image recognition module 473 may store the identification information on the recognized object(s) as category information in the database (e.g., the raw-image storage 479). This is so the identification information is associated with the image. For example, the image may include the identification information as tag information on the image and may store the same in the database. The image recognition module 473 may also transmit the identification information to the second electronic device 400. The category information may be organized as a plurality of categories that are hierarchically classified. For example, if a "cat" is recognized as an object in an image segment of the image, the image recognition module 473 may set the identification information indicating "animals" as a parent category of the image, and may set the identification information indicating a "cat" as a subcategory of the image. According to some embodiments, the first electronic device 470 may receive category information corresponding to the image (e.g., the raw image or the small-raw image) from the second electronic device 400, and may store the same in the database so that the category information is associated with the image.

According to an embodiment, the ISP 476 may perform image processing (e.g., correction) by adjusting energy values (e.g., brightness, color, saturation, color temperature, sharpness, color harmony, vividness, contrast, hue saturation value (HSV), and the like). The image processing may be performed on the basis of recipe information (e.g., image segment, layer, vector, scene category, etc.) obtained through the image recognition. For example, the ISP 476 may recognize an image segment in which an object is located in the image as the correction target, and may perform correction on that image segment. The ISP 476 may receive additional information (e.g., feature vectors representing the features (e.g. hair) of the object) corresponding to the recipe information from the database 478, and may utilize the same for the image processing. The processed image may be transmitted to the second electronic device 400 or the encoder 475, or may be stored in the database (e.g., the image storage 480). The image processing may include functions such as white balance, color adjustment, noise reduction, sharpening, detail enhancement, and the like. These functions may be performed for each image segment on the basis of the recipe information.

According to an embodiment, the encoder 475 may encode the corrected image processed by the ISP 476 or the raw image stored in the raw-image storage 479, thereby generating an image file encoded in a specific format (e.g., JPEG, MPEG, 360-degree panorama, etc.). The image file generated by the encoder 475 may be transmitted to the second electronic device 400 via the communication module of the first electronic device 470, or may be stored in the database (e.g., the image storage 480).

According to an embodiment, the monitoring module 472 may identify that the ISP 476, which is configured to process the image in the first electronic device 470, has switched from a first ISP 476a to a second ISP 476b. For example, the second ISP 476b may be configured by upgrading at least part of the correction scheme of the first ISP 476a.

According to an embodiment, in response to the identification of the monitoring module 472, the test-target obtaining module 481 may obtain, as test targets for image processing, some of the images stored in the database (e.g., the raw-image storage 479 or the image storage 480). According to an embodiment, if the test target is obtained from the raw-image storage 479, the image may be processed using a correction scheme (e.g., using the first ISP 467a) to which a change (e.g., replacement or upgrade) has not been applied and using another correction scheme (e.g., using the second ISP 476b) to which a change has been applied. According to an embodiment, if the test target is obtained from the image storage 480, the image may be processed using the correction scheme (e.g., using the second ISP 476b) to which the change has been applied.

According to an embodiment, the test-target obtaining module 481 may obtain the same number of test targets for different categories from the database. For example, the test-target obtaining module 481 may obtain as test targets the same number of images that fall into the category of "dogs" as the number of images that fall into the category of "cats."

In an embodiment, the first ISP 476a and the second ISP 476b may each correct the test targets obtained by the test-target obtaining module 481, thereby obtaining various energy values (e.g., brightness, color, saturation, color temperature, sharpness, color harmony, vividness, contrast, HSV, or the like) of the respective test targets. According to some embodiments, if the test target is a compressed image obtained from the image storage 480, the correction may be performed after decompressing the image.

According to an embodiment, the image comparison module 482 may calculate the difference between an energy value obtained through the image correction by the first ISP 476a and an energy value obtained through the image correction by the second ISP 476b for each of the test targets obtained from the database (e.g., the raw-image storage 479). For example, the image comparison module 482 may select, as a comparison item, at least one of the brightness, the color, the saturation, the color temperature, the sharpness, the color harmony, the vividness, the contrast, or the HSV. The comparison item may be selected based on a tuning policy (e.g., effect) that is expected from the change in the correction scheme. For example, if the effect expected by changing the correction scheme is an increase in contrast, the image comparison module 482 may calculate the difference between contrast values obtained by the image correction of the first ISP 476a and by the image correction of the second ISP 476b for each of the test targets. If the expected effect is an increase in the vividness of the image segment with an HSV of about 30 to 60 degrees, the image comparison module 482 may calculate the difference between color values obtained by the image correction of the first ISP 476a and by the image correction of the second ISP 476b for each of the test targets.

According to an embodiment, the image comparison module 482 may calculate the difference between energy values before the image correction by the second ISP 476b and after the image correction by the second ISP 476b for each of the test targets obtained from the database (e.g., the image storage 480).

According to an embodiment, the image comparison module 482 may classify the test targets into two groups on the basis of the comparison results. For example, the image comparison module 482 may classify the test targets into a parent group in which the test targets have difference values exceeding a predetermined threshold value and a subgroup in which the test targets have difference values below the threshold value. Here, the difference value may mean (1) the difference between energy values obtained by the image correction of the first ISP 476a and by the image correction of the second ISP 476b or (2) the difference between energy values before the image correction of the second ISP 476b and after the image correction of the second ISP 476b.

According to an embodiment, the correction-target determination module 483 may determine correction targets on the basis of the comparison results obtained by the image comparison module 482. Here, the correction targets may be selected from among the images stored in the database (e.g., the raw-image storage 479 or the image storage 480). The images of the correction targets may be processed by the correction scheme (e.g., by the second ISP 467b) to which a change (e.g., replacement or upgrade) has been applied, and may then be stored in the database (e.g., the image storage 480) and/or may be transmitted to the second device 400. According to an embodiment, the correction-target determination module 483 may recognize the subgroup classified by the image comparison module 482 as the group whose corrected images fall short of expectations. Accordingly, the correction-target determination module 483 may identify the categories of the images belonging to the subgroup, and may determine that the images corresponding to the categories of the subgroup are not targets to be corrected. Conversely, the correction-target determination module 483 may select at least one test target from the parent group, and may determine the images corresponding to the category of the selected test target as correction targets.

According to an embodiment, category information used to determine the correction targets may include information obtained by the image recognition module 473 and stored in the database (e.g., the raw-image storage 479 or the image storage 480) in such a way that they are associated with the images. In addition, the category information may include information, such as metadata of the image, which is received from an external device (e.g., the electronic device 400) together with the image when the image is transmitted from the external device.

In an embodiment, according to the comparison results obtained by the image comparison module 482, a certain category may be associated with both the parent group and the subgroup. For example, a first test target in the "cat" category may belong to the parent group, while a second test target in the "cat" category may belong to the subgroup. In this case, the images corresponding to the category may have correction effect falling short of expectations. Accordingly, the correction-target determination module 483 may exclude the "cat" category from the correction targets.

According to an embodiment, the correction-target determination module 483 may determine, as a correction target, a test target that corresponds to category information that includes a category corresponding to a first level and does not include a category corresponding to a second level.

Here, the category corresponding to the first level may be the category belonging to the parent group, and the category corresponding to the second level may be the category belonging to the subgroup.

In an embodiment, according to the comparison results obtained by the image comparison module 482, some metadata may be commonly associated with a test target belonging to the parent group and a test target belonging to the subgroup. For example, a first test target belonging to the parent group and a second test target belonging to the subgroup may have the same ISO sensitivity value. In addition, some recipe information (e.g., scene category) may be commonly associated with a test target belonging to the parent group and a test target belonging to the subgroup. As described above, the correction effect corresponding to metadata or recipe information commonly associated with the parent group and the subgroup may not meet expectations. Accordingly, the correction-target determination module 483 may determine that the images having this metadata or recipe information are not correction targets.

According to an embodiment, the correction-target determination module 483 may determine the correction targets on the basis of at least one piece of metadata or recipe information in addition to the comparison result obtained by the operation of the image comparison module 482. For example, the correction-target determination module 483 may identify the metadata of the test targets belonging to the parent group (hereinafter, referred to as a "parent metadata set"), and may identify the metadata of the test targets belonging to the subgroup (hereinafter, referred to as a "sub-metadata set"). The correction-target determination module 483 may compare the parent metadata set with the sub-metadata set, thereby determining the metadata of the sub-metadata set that overlap with to the parent metadata set (hereinafter, referred to as an "overlapping metadata set"). The correction-target determination module 483 may determine, as a correction target, an image that corresponds to at least one piece of metadata of the parent metadata set but does not correspond to at least two pieces of metadata of the overlapping metadata set. For example, if the parent metadata set includes a first ISO sensitivity value, a second ISO sensitivity value, a first brightness value, a second brightness value, a first sharpness value, and a second sharpness value, and the overlapping metadata includes the first ISO sensitivity value, the first brightness value, and the first sharpness value, an image having the first ISO sensitivity value, the second brightness value, and the second sharpness value may be determined as a correction target. The image having the first ISO sensitivity value, the first brightness value, and the second sharpness value may be excluded from the correction targets.

According to an embodiment, the metadata may be received from the external device (e.g., the electronic device 400) along with the image, and may be stored in the database (e.g., the raw-image storage 479 or the image storage 480) so as to be associated with the image. For example, the metadata, which may be information obtained by the image sensor (e.g., the image sensor 411), may include the focal length, the auto-focus area, orientation information, auto white balance (AWB), the color space, exposure time, aperture-related information (e.g., F-number or F-stop), the exposure program (e.g., automatic mode, aperture-priority mode, shutter-priority mode, manual mode, etc.), ISO (ISO speed ratings), the date and time stamp (date time original), and the like. In addition, the metadata may include information such as the image capturing location or the external illuminance when the image is taken. These information may be captured by sensors other than the image sensor.

According to an embodiment, the recipe information may include information (e.g., image segment, layer, vector, scene category, etc.) obtained by operations of the image recognition module 473 which recognize the image (e.g., the small-raw image) received from the external device (e.g., the electronic device 400).

According to an embodiment, the correction-target determination module 483 may determine correction targets by further considering the tuning policy (e.g., effect). For example, if the expected effect is an increase in the brightness when the image is corrected by the correction scheme (e.g., by the second ISP 467b) to which the change (e.g., replacement or upgrade) has been applied, the correction-target determination module 483 may apply a weight to differences in brightness (for example, may add a predetermined value to the differences) so that more images whose brightness was increased by the changed correction scheme can be classified into the parent group.

According to an embodiment, the second electronic device 400 (e.g., the electronic device 101) may include a camera module 410, a display 420, a first processor 430, a first memory 440, an input device 450, and an audio output device 460. According to embodiments, the camera module 410 may include an image sensor 411, a second processor 412, and a second memory 418. According to embodiments, the second processor 412 may include a raw-image processing module 413, an ISP 416, and an encoder 417. At least some of the operations performed by the second processor 412 may be performed by the first processor 430. The raw-image processing module 413, the ISP 416, and the encoder 417 may be logical modules, and thus the operations thereof may be performed by the second processor 412 (e.g., the processor 120). In another embodiment, at least one of the raw-image processing module 413, the ISP 416, and the encoder 417 may be implemented as hardware inside the second processor 412.

Although it is not shown in the figure, the second electronic device 400 may include a communication module (e.g., the communication module 190 in FIG. 1) for data communication with the first electronic device 470, and the electronic device 470 may also include a communication module for data communication with the second electronic device 400.

In an embodiment, the image sensor 411 (e.g., the image sensor 230 in FIG. 2 or the image sensor 321 in FIG. 3) may obtain various raw images of the object. The image sensor 411 may obtain various types of raw images depending on color filter array (CFA) patterns. The image sensor 411 may obtain the raw image in a dual pixel (DP) structure (or a dual photodiode (2PD) structure) that includes different time-difference (or phase-difference) information in one pixel. The image sensor 411 may include a plurality of image sensors having various properties (e.g., a dual sensor such as RGB+RGB, RGB+Mono, Wide+Tele, etc. sensors), an array sensor (e.g., two or more sensors are provided), or the like, and may obtain one or more raw images for a single instance of image capture using the plurality of image sensors. The obtained raw images may be stored in the second memory 418 (e.g., DRAM) without or after further processing.

The raw images obtained in accordance with above embodiment may be configured in various formats (e.g., the Bayer format or the like). The raw image may be expressed as one of R (red), G (green), and B (blue) value for each pixel, and may have a bit-depth of 8 to 16 bits. A variety of color filter array (CFA) patterns may be applied to the raw image. The raw image may have a layer structure including information on a plurality of colors (e.g., R, G, and B) for each pixel. Depending on various configurations of the image sensor, the raw image may include time-difference (phase-difference) information as well as color information. Information (e.g., time, location, illuminance, etc.) related to the image capture may be generated as metadata, and may be stored in association with the raw image. For example, the second processor 412 may obtain the metadata on the raw image through the image sensor 411. The metadata, which is obtainable through the image sensor 411, may include information such as the focal length, the auto focus area, orientation information, the color space, exposure time, and the like. In addition, the metadata may include location information on where the image was captured, which can be obtained through a sensor (e.g., a GPS sensor) that is not the image sensor.

In an embodiment, the raw-image processing module 413 may perform various processes with respect to the raw image obtained from the image sensor 411. For example, the raw-image processing module 413 may perform lens distortion compensation or noise removal with respect to the raw image.

According to an embodiment, the raw-image processing module 413 may include a small-raw image generation module 414 and a compression module 415. The small-raw image generation module 414 may generate a small-raw image from the raw image using various down-scale schemes (e.g., reducing the size or lowering resolution) or down-sampling schemes (e.g., taking one or more sets of samples from the raw image). The compression module 415 may compress the raw image or the small-raw image using various compression algorithms, and may store the compressed raw image or the compressed small-raw image in the second memory 418. The small-raw image may be temporarily or permanently stored in the second memory 418. The communication module (not shown) (e.g., the communication module 190) of the second electronic device 400 may transmit the small-raw image stored in the second memory 418 to the first electronic device 470.

In an embodiment, the ISP 416 (e.g., the image signal processor 260 in FIG. 2 or the ISP 323 in FIG. 3) may perform image processing with respect to the raw image stored in the second memory 418. For example, the ISP 416 may perform various processes (e.g., correction) with respect to the raw image using the recipe information (e.g., image segment, layer, vector, scene category, etc.) obtained from the first electronic device 470 via the communication module. According to an embodiment, the ISP 416 may transmit the raw image or the small-raw image to the first electronic device 470 via the communication module so that the first electronic device 470 may generate the recipe information for image processing. The ISP 416 may then process the raw image using the recipe information obtained from the first electronic device 470 via the communication module. The ISP 416 may compress the processed raw image, for example, in a JPEG format, and may store the same in the first memory 440.

In an embodiment, the ISP 416 performing image processing in the second electronic device 400 may switch from the first ISP 416a to the second ISP 416b. For example, the second ISP 416b may be configured by upgrading the at least part of the correction scheme of the first ISP 416a.

In an embodiment, the encoder 417 may encode the raw image processed by the ISP 416, thereby generating an encode image file (e.g., a JPEG, MPEG, 360-degree panorama file, etc.), and may store the image file in the first memory 440.

In an embodiment, the first processor 430 (e.g., the processor 120 in FIG. 1) may be electrically connected to the camera module 410, the display 420, the first memory 440, the input device 450, the audio output device 460, and the communication module (not shown), thereby controlling at least one thereof, and may perform processing for a variety of data processing and calculation.

According to an embodiment, in response to the operation in which the ISP 416 switches from the first ISP 416a to the second ISP 416b, the first processor 430 may update the images stored in the first memory 440. For example, the first processor 430 may perform the same functions as at least some functions of the processor 471 of the first electronic device 470 (e.g., at least one of the test-target obtaining module 481, the image comparison module 482, and the correction-target determination module 483).

Figure 5:
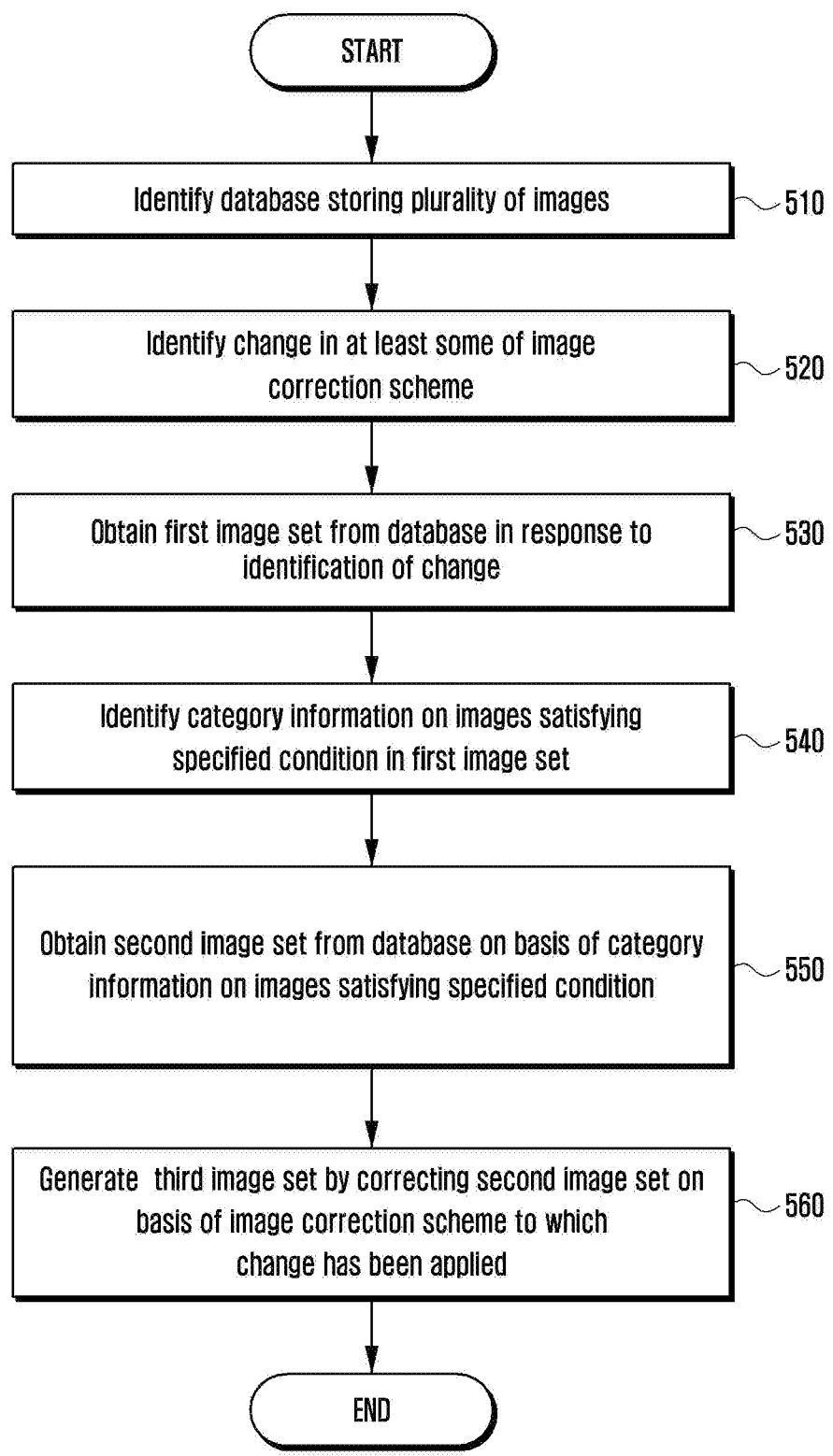
FIG. 5 is a flowchart illustrating the operation of a processor according to an embodiment.

FIG. 5 is a flowchart illustrating the operations of a processor according to an embodiment.

Referring to FIG. 5, the following operations according to an embodiment may be executed by the processor (e.g., 471 or 430) in FIG. 4.

According to an embodiment, in operation 510, the processor may identify a database that stores a plurality of images. For example, the database may include the raw-image storage 479 and the image storage 480 of the first electronic device 470, or may include the first memory 440 and the second memory 418 of the second electronic device 400. The database may include category information associated with the images. For example, if the object recognized in the image is a cat, information indicating "animals" may be stored, as a parent category, in the database so as to be associated with the image, and information indicating a "cat" may be stored, as a subcategory, in the database so as to be associated with the image.

According to an embodiment, in operation 520, the processor may identify, at least in part, a change in the image correction scheme. For example, the processor may identify that at least some of the functions of the ISP (e.g., 476 or 416 in FIG. 4) have been upgraded.

According to an embodiment, in operation 530, the processor may obtain a first image set including images (e.g., test targets obtained by the test-target obtaining module 481 in FIG. 4) from the database in response to the identification of the change. The processor may obtain first data by correcting the images of the first image set using an image correction scheme to which no change has been applied, and may obtain second data by correcting the images of the first image set using an image correction scheme to which the change has been applied. Here, the first data and the second data include values indicating the effects of image corrections, such as values indicating brightness, color, saturation, color temperature, sharpness, color harmony, vividness, contrast, HSV, etc. The processor may calculate the difference between the first data and the second data for each of the images of the first image set. According to some embodiments, if the first image set has compressed images, decompression may be performed before the image correction scheme is applied. According to some embodiments, the processor may obtain the first data on the original images in the first image set, that is, without correcting the images using the image correction scheme to which no change has been applied.

According to an embodiment, in operation 540, the processor may identify category information on the images that satisfy a specified condition in the first image set. Here, the images satisfying the specified condition may mean images having a difference between the first data and the second data that exceeds a predetermined threshold value.

According to an embodiment, in operation 550, the processor, on the basis of the category information, may obtain a second image set including a plurality of images (e.g., correction targets obtained by the correction target determination module 483 in FIG. 4) from the database.

According to an embodiment, the processor may identify, from the category information on the images satisfying the specified condition, a first category corresponding to a first level (e.g., a category of test targets belonging to a parent group classified by the correction-target determination module 483 in FIG. 4) and a second category corresponding to a second level (e.g., a category of test targets belonging to a subgroup). The processor may determine, as the second image set, the images of the first category, which does not have the second category, among the plurality of images stored in the database.

According to an embodiment, in operation 560, the processor may generate a third image set by correcting the second image set on the basis of the image correction scheme to which the change has been applied.

Figure 6:
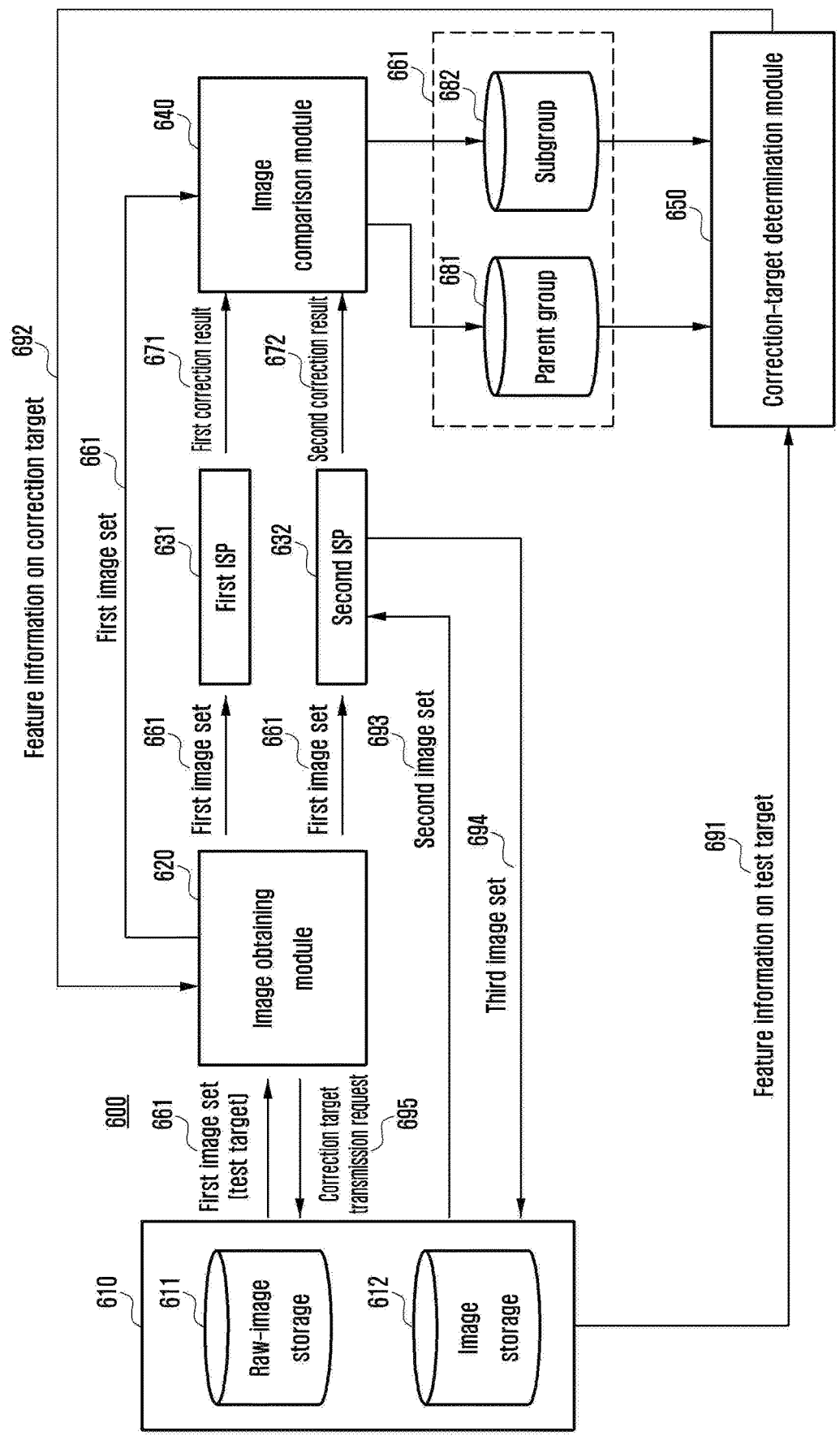
FIG. 6 is a block diagram illustrating the operations of an electronic device according to an embodiment.

FIG. 6 is a block diagram illustrating the operations of an electronic device according to an embodiment.

Referring to FIG. 6, according to an embodiment, an electronic device 600 (e.g., 400 or 470 in FIG. 4) may include a database 610, an image obtaining module 620, a first ISP 631, a second ISP 632, an image comparison module 640, and a correction-target determination module 650.

According to an embodiment, the database 610, the image obtaining module 620, the first ISP 631, the second ISP 632, the image comparison module 640, and the correction-target determination module 650 may be operably connected to each other, and thus may freely transmit and share data to and with each other. According to an embodiment, at least one of the above modules may be a logical module, so that at least one processor (e.g., 412, 430, or 471 in FIG. 4) may perform the operations thereof. According to an embodiment, at least one of the modules may be implemented as hardware inside the processor (e.g., 412, 430, or 471 in FIG. 4).

According to an embodiment, the image obtaining module 620 (e.g., processor 471 or 430 in FIG. 4) may obtain, as test targets, some of the images stored in a raw-image storage 611 (e.g., 479 or 418 in FIG. 4) of the database 610, thereby generating a first image set 661, and may transmit the same to the first ISP 631, the second ISP 632, and the image comparison module 640. As described above with reference to FIG. 4, the first image set may include an equal number of images for various categories (e.g. "animals"). According to some embodiments, if the test targets obtained from the raw-image storage 611 are compressed images, the image obtaining module 620 may decompress the test targets using a decoder, and may then transmit the same to the first ISP 631, the second ISP 632, and the image comparison module 640.

In an embodiment, the first ISP 631 (e.g., 476a or 416a in FIG. 4) may correct the images of the first image set 661, and may transmit a first correction result 671 to the image comparison module 640. The first correction result 671 may include images having various aspects (e.g., at least one of brightness, color, saturation, color temperature, sharpness, color harmony, vividness, contrast, HSV, and the like) that are corrected.

In an embodiment, the second ISP 632 (e.g., 476b or 416b in FIG. 4) may correct the images of the first image set 661, and may transmit a second correction result 672 to the image comparison module 640. The second correction result 672 may also include images having various aspects (e.g., at least one of brightness, color, saturation, color temperature, sharpness, color harmony, vividness, contrast, HSV, and the like) that are changed according to an upgraded correction scheme.

According to an embodiment, the image comparison module 640 (e.g., 482 or 430 in FIG. 4) may compare the first correction result 671 and the second correction result 672, and may, on the basis of the comparison result, classify the images of the first image set 661 into a parent group 681 and a subgroup 682, and then transmitting the same to the correction-target determination module 650. An example of the classification is described above in connection with FIG. 4.

According to an embodiment, the correction-target determination module 650 (e.g., 483 or 430 in FIG. 4) may determine correction targets on the basis of at least the category information on the images included in the parent group 681, the category information on the images included in the subgroup 682, metadata on the images included in the parent group 681, recipe information on the images included in the parent group 681, metadata on the images included in the subgroup 682, and recipe information on the images included in the subgroup 682. Various examples of determining the correction targets are described above in connection with FIG. 4.

According to an embodiment, the correction-target determination module 650 may obtain feature information 691 (e.g., category information, metadata, or recipe information) on the test targets necessary for determining the correction targets from the database 610 (e.g., 611 or 612).

According to some embodiments, the feature information may be included in the images of the first image set 661. Therefore, the correction-target determination module 650 may obtain the feature information through another module (e.g., the image obtaining module 620 or the image comparison module 640) other than the database 610, and may obtain the feature information from the first image set 661.

According to an embodiment, the correction-target determination module 650 may transmit the feature information 692 on the correction targets to the image obtaining module 620. For example, the feature information 692 may include at least category information.

According to an embodiment, the image obtaining module 620 may transmit the feature information 692 to the database 610 so as to make a request 695 to the database 610 for transmitting the correction targets (the second image set 693) to the second ISP 632. The second ISP 632 may receive the second image set 693 from the raw-image storage 611, may generate a third image set 694 by correcting the second image set 693, and may store the third image set 694 in the image storage 612 (e.g., 480 or 440 in FIG. 4). According to some embodiments, the second ISP 632 may be configured to obtain the correction targets itself. In this case, the second ISP 632 may directly receive the feature information 692 from the correction-target determination module 650, and may obtain the second image set 693 through the raw-image storage 611.

Figure 7:
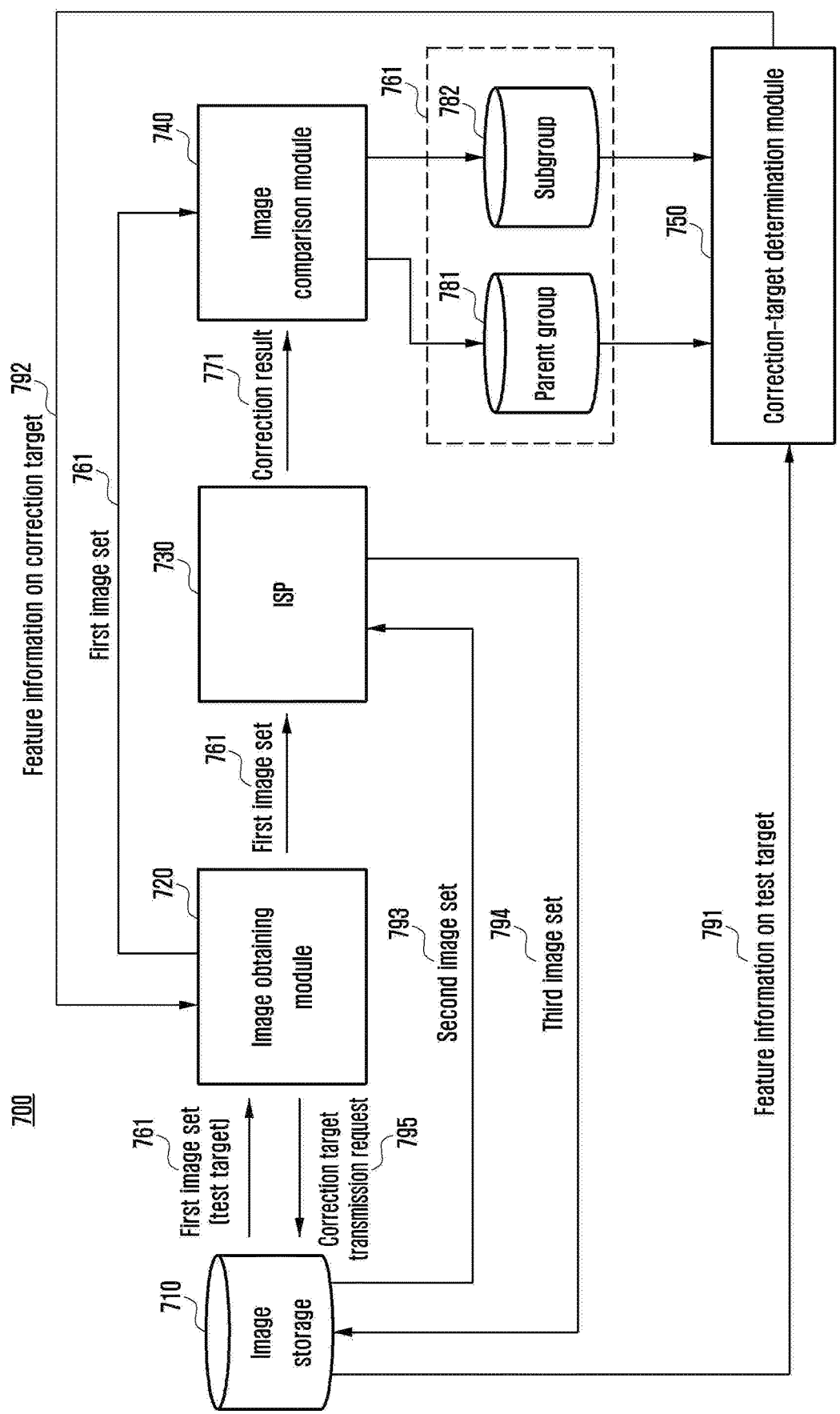
FIG. 7 is a block diagram illustrating the operations of an electronic device according to an embodiment.

FIG. 7 is a block diagram illustrating the operations of an electronic device according to an embodiment.

Referring to FIG. 7, according to an embodiment, an electronic device 700 (e.g., 400 or 470 in FIG. 4) may include an image storage 710, an image obtaining module 720, an ISP 730, an image comparison module 740, and a correction-target determination module 750.

According to an embodiment, the image storage 710, the image obtaining module 720, the ISP 730, the image comparison module 740, and the correction-target determination module 750 may be operably connected to each other, and thus may freely transmit and share data to and with each other. According to an embodiment, at least one of the above modules may be a logical module, so that at least one processor (e.g., 412, 430, or 471 in FIG. 4) may perform the operations thereof. According to an embodiment, at least one of the modules may be implemented as hardware inside the processor (e.g., 412, 430, or 471 in FIG. 4).

According to an embodiment, the image obtaining module 720 (e.g., processor 471 or 430 in FIG. 4) may obtain, as test targets, some of the images stored in the image storage 710 (e.g., 480 or 440 in FIG. 4), thereby generating a first image set 761, and may transmit the same to the ISP 730 and the image comparison module 740. As described above with reference to FIG. 4, the first image set may include an equal number of images for various categories (e.g. "animals"). According to some embodiments, if the test targets obtained from the image storage 710 are compressed images, the image obtaining module 720 may decompress the test targets using a decoder, and may then transmit the same to the ISP 730.

In an embodiment, the ISP 730 (e.g., 476b or 417b in FIG. 4) may correct the images of the first image set 761, and may transmit a correction result 771 to the image comparison module 740. The correction result 771 may include images having various aspects (e.g., at least one of brightness, color, saturation, color temperature, sharpness, color harmony, vividness, contrast, HSV, and the like) that are corrected.

According to an embodiment, the image comparison module 740 (e.g., 482 or 430 in FIG. 4) may compare the first image set 761 and the correction result 771 thereof, and may, on the basis of the comparison result, classify the images of the first image set 761 into a parent group 781 and a subgroup 782, and then transmitting the same to the correction-target determination module 750. An example of the classification is described above in connection with in FIG. 4.

According to an embodiment, the correction-target determination module 750 (e.g., 483 or 430 in FIG. 4) may determine correction targets on the basis of at least the category information on the images included in the parent group 781, the category information on the images included in the subgroup 782, metadata on the images included in the parent group 781, recipe information on the images included in the parent group 781, metadata on the images included in the subgroup 782, and recipe information on the images included in the subgroup 782. Various examples of determining the correction targets are described above in connection with in FIG. 4.

According to an embodiment, the correction-target determination module 750 may obtain feature information 791 (e.g., category information, metadata, or recipe information) on the test targets necessary for determining the correction targets from the image storage 710. According to some embodiments, the feature information may be included in the images of the first image set 761. Therefore, the correction-target determination module 750 may obtain the feature information through another module (e.g., the image obtaining module 720 or the image comparison module 740) other than the image storage 710, and may obtain the feature information from the first image set 761.

According to an embodiment, the correction-target determination module 750 may transmit the feature information 792 on the correction targets to the image obtaining module 720. For example, the feature information 792 may include at least category information.

According to an embodiment, the image obtaining module 720 may transmit the feature information 792 to the image storage 710 so as to make a request 795 to the image storage 710 for transmitting the correction targets (the second image set 793) to the ISP 730. The ISP 730 may receive the second image set 793 from the image storage 710, may generate a third image set 794 by correcting the second image set 793, and may store the third image set 794 in the image storage 710. According to some embodiments, the ISP 730 may have be configured to obtain the correction targets itself. In this case, the ISP 730 may directly receive the feature information 792 from the correction-target determination module 750, and may obtain the second image set 793 through the image storage 710.

Figure 8:
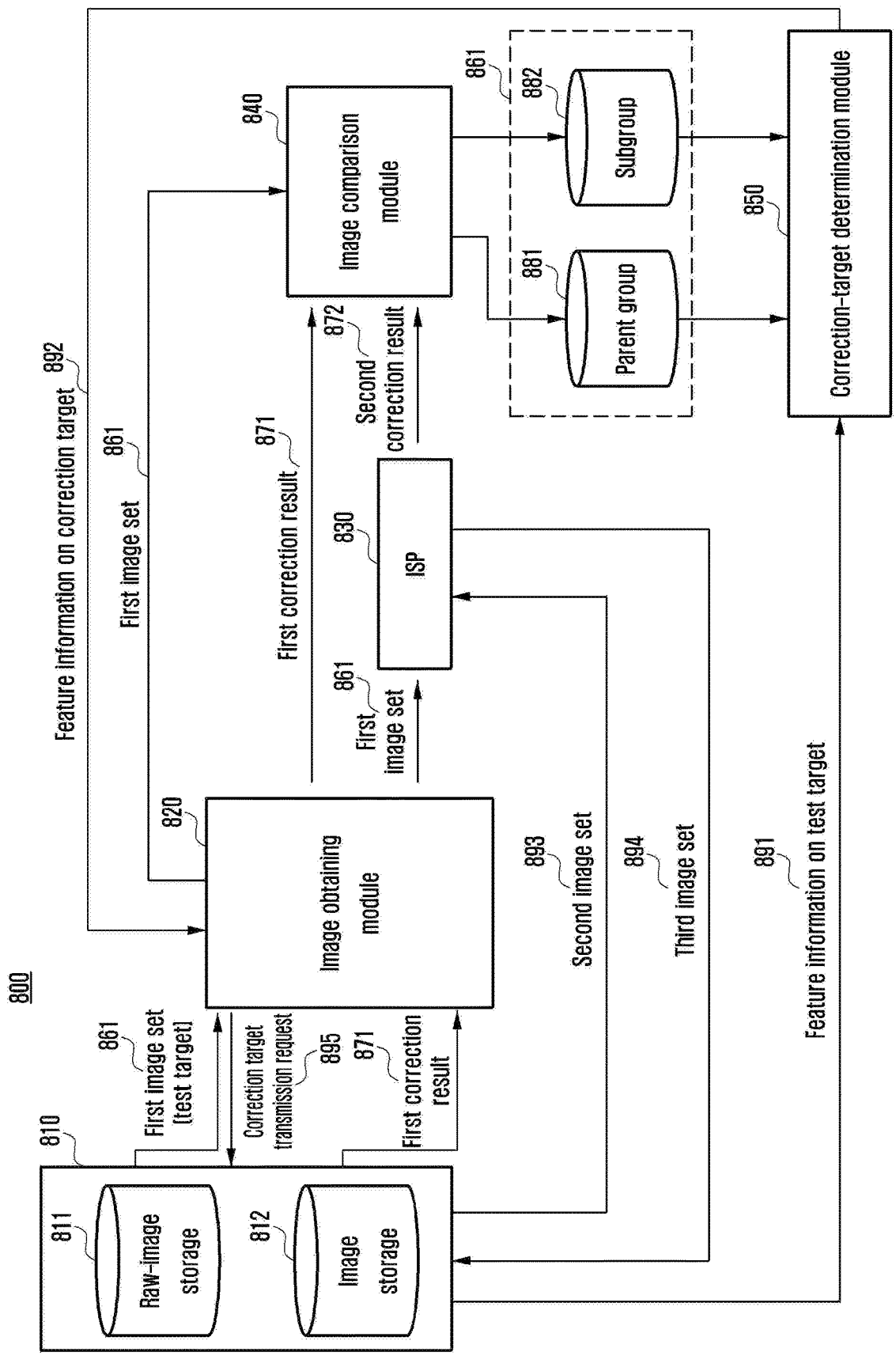
FIG. 8 is a block diagram illustrating the operations of an electronic device according to an embodiment.

FIG. 8 is a block diagram illustrating the operations of an electronic device according to an embodiment.

Referring to FIG. 8, according to an embodiment, an electronic device 800 (e.g., 400 or 470 in FIG. 4) may include a database 810, an image obtaining module 820, an ISP 830, an image comparison module 840, and a correction-target determination module 850.

According to an embodiment, the database 810, the image obtaining module 820, the ISP 830, the image comparison module 840, and the correction target determination module 850 may be operably connected to each other, and thus may freely transmit and share data to and with each other. According to an embodiment, at least one of the above modules may be a logical module, so that at least one processor (e.g., 412, 430, or 471 in FIG. 4) may perform the operations thereof. According to an embodiment, at least one of the modules may be implemented as hardware inside the processor (e.g., 412, 430, or 471 in FIG. 4).

According to an embodiment, the image obtaining module 820 (e.g., processor 471 or 430 in FIG. 4) may obtain, as test targets, some of the images stored in a raw-image storage 811 (e.g., 479 or 418 in FIG. 4) of the database 810, thereby generating a first image set 861, and may transmit the same to the ISP 830 and the image comparison module 840.

According to an embodiment, the image obtaining module 820 may obtain a first correction result 871 corresponding to the first image set 861, and may transmit the same to the image comparison module 840.

In an embodiment, the ISP 830 (e.g., 476b or 416b in FIG. 4) may correct the images of the first image set 861, and may transmit a second correction result 872 including energy values representing the correction results of the images to the image comparison module 840. According to an embodiment, the image comparison module 840 (e.g., 482 or 430 in FIG. 4) may compare the first correction result 871 and the second correction result 872, and, on the basis of the comparison result, may classify the images of the first image set 861 into a parent group 881 and a subgroup 882, thereby transferring the same to the correction-target determination module 850.

According to an embodiment, the correction-target determination module 850 (e.g., 483 or 430 in FIG. 4) may determine correction targets on the basis of at least the category information on the images included in the parent group 881, the category information on the images included in the subgroup 882, metadata on the images included in the parent group 881, recipe information on the images included in the parent group 881, metadata on the images included in the subgroup 882, and recipe information on the images included in the subgroup 882. According to an embodiment, the correction-target determination module 850 may obtain feature information 891 (e.g., category information, metadata, or recipe information) on the test targets necessary for determination of the correction targets through the raw-image storage 810 (or the image storage 815). According to some embodiments, the feature information may be contained in the images of the first image set 861. Thus, the correction-target determination module 850 may obtain the feature information through another module (e.g., the image obtaining module 820 or the image comparison module 840) other than the database 810, and may obtain the feature information from the first image set 861.

According to an embodiment, the correction-target determination module 850 may transmit the feature information 892 on the correction targets to the image obtaining module 820.

According to an embodiment, the image obtaining module 820 may transmit the feature information 892 to the raw-image database 810 so as to make a request 895 to the database 810 for transmitting the correction targets (the second image set 893) to the ISP 830. The ISP 830 may receive the second image set 893 from the raw-image storage 811, may generate a third image set 894 by correcting the second image set 893, and may store the third image set 894 in the image storage 812. According to some embodiments, the ISP 830 may be configured to obtain the correction targets itself. In this case, the ISP 830 may directly receive the feature information 892 from the correction-target determination module 850, and may obtain the second image set 893 through the raw-image storage 811.

According to an embodiment, an electronic device may include: a communication module; a memory; and a processor, wherein the processor may be configured to: identify a database that stores a plurality of raw images received from an external device and includes a plurality of category information stored in association with at least some of the plurality of raw images and determined based on image recognition of the at least some of the plurality of raw images; identify a change, at least in part, in an image correction scheme of the electronic device; obtain a first raw-image set from among the plurality of raw images, from the database correcting a first raw image in the first raw-image set based on a first image correction scheme to which the change has not been applied; correcting the first raw image based on a second image correction scheme to which the change has been applied; determining whether a difference between data obtained by correcting the first raw image based on the first image correction scheme and data obtained by correcting the first raw image based on the second image correction scheme satisfies a specified condition; identifying category information corresponding to the first raw image based on determining that the difference satisfies the condition; obtain a second raw-image set from among the plurality of raw images, from the database, based on the category information; and correct the second raw-image set based on the second image correction scheme, thereby generating a third raw-image set.

The category information corresponding to the first raw image comprises a first level and a second level lower than the first level, and the processor may be configured to: identify a first category of the images in the first raw-image set corresponding to the first level and a second category of the images in the first raw-image set corresponding to the second level; and obtain raw images from among the plurality of raw images corresponding to the first category but not to the second category.

Each of the first category and the second category comprises identification information of objects recognized from the plurality of raw images based at least on the image recognition.

The category information includes identification information of at least one object recognized from the images in the first raw-image set based on the image recognition.

The processor may be configured to: obtain first data by correcting raw images in the first raw-image set using the first image correction scheme; obtain second data by correcting the raw images in the first raw-image set using the second image correction scheme; calculate a difference in an energy value between the first data and the second data for each of the raw images in the first raw-image set; and classify each of the raw images in the first raw-image set into a parent group comprised of images having difference exceeding a predetermined threshold value and a subgroup comprised of images having difference lower than the predetermined threshold value, wherein the first raw image belongs to the parent group.

The category information corresponding to the first raw image comprises a plurality of categories, and the processor is configured to, in response to the fact that the category information on a second raw image belonging to the subgroup comprises some of the plurality of categories, obtain the second raw-image set based on at least one of the remaining categories, except for the some of the plurality of categories.

The energy value comprises at least one of brightness, color, saturation, color temperature, sharpness, color harmony, vividness, contrast, or HSV.

The processor is further configured to, in response to determining that data obtained using the second image correction scheme corresponds to an expected correction result, apply a weight to a difference corresponding to the correction result.

The processor is configured to, in response to some of a plurality of pieces of metadata associated with the first raw image being associated with a second raw image belonging to the subgroup, obtain the second raw-image set based on at least one piece of the remaining metadata, except for the some of the plurality of pieces of metadata.

The plurality of pieces of metadata is obtained by an image sensor along with the first raw images and are then stored in the database.

According to an embodiment, an electronic device may include: a communication module; a first processor configured to correct images; and a second processor operatively connected to the communication module and the first processor, wherein the second processor may be configured to: control the first processor to correct a first image set obtained from a database; select at least one image from the first image set based at least on a correction result of the first image set; and transmit feature information on the selected at least one image to the first processor, and the first processor may be configured to: obtain a second image set from the database based on the feature information; and generate a third image set by correcting the second image set.

The first image set obtained from the database may be corrected using a first correction scheme and a second correction scheme, the at least one image may be selected based at least on difference between a first correction result according to the first correction scheme and a second correction result according to the second correction scheme, and the third image set may be generated by correcting the second image set using the second correction scheme.

The at least one image may be selected based at least on a difference between the first image set and the correction result.

The feature information may include at least one of category information, metadata, and recipe information of the at least one image.

The category information may include a category of at least one object recognized in the at least one selected image.

The at least one image is selected based additionally on feature information of at least other image in the first image set.

The feature information may include at least one piece of metadata and recipe information of the at least one other image.

The database may store images received from an external device via the communication module.

According to an embodiment, a method for operating an electronic device may include: identifying a database that stores a plurality of raw images received from an external device, the database including a plurality of category information stored in association with at least some of the plurality of raw images and determined based on image recognition of the at least some of the plurality of raw images; identifying a change, at least in part, in an image correction scheme of the electronic device; obtaining a first raw-image set from among the plurality of raw images, from the database; correcting a first raw image in the first raw-image set based on a first image correction scheme to which the change has not been applied; correcting the first raw image based on a second image correction scheme to which the change has been applied; determining whether a difference between data obtained by correcting the first raw image based on the first image correction scheme and data obtained by correcting the first raw image based on the second image correction scheme satisfies a specified condition; identifying category information corresponding to the first raw image based on determining that the difference satisfies the condition; obtaining a second raw-image set from among the plurality of raw images, from the database, based on the category information; and correcting the second raw-image set based on the second image correction scheme, thereby generating a third raw-image set.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The embodiments of the present disclosure disclosed in the specification and the drawings are only particular examples proposed in order to easily describe the technical matters of the present disclosure and help with comprehension of the present disclosure, and do not limit the scope of the present disclosure. Therefore, in addition to the embodiments disclosed herein, the scope of the various embodiments of the present disclosure should be construed to include all modifications or modified forms drawn based on the technical idea of the various embodiments of the present disclosure.

What is claimed is:

1. An electronic device comprising:
a communication module;
a memory; and
a processor, wherein the processor is configured to:
identify a database that stores a plurality of raw images received from an external device, the database comprising a plurality of category information stored in association with at least some of the plurality of raw images and determined based on image recognition of the at least some of the plurality of raw images;
identify a change, at least in part, in an image correction scheme of the electronic device;
obtain a first raw-image set from among the plurality of raw images, from the database;
correct a first raw image in the first raw-image set based on a first image correction scheme to which the change has not been applied;
correct the first raw image based on a second image correction scheme to which the change has been applied;
determine whether a difference between data obtained by correcting the first raw image based on the first image correction scheme and data obtained by correcting the first raw image based on the second image correction scheme satisfies a specified condition;
identify category information corresponding to the first raw image based on determining that the difference satisfies the condition;
obtain a second raw-image set from among the plurality of raw images, from the database, based on the category information; and
correct the second raw-image set based on the second image correction scheme to generate a third raw-image set.

2. The electronic device of claim 1, wherein the category information corresponding to the first raw image comprises a first level and a second level lower than the first level, and wherein the processor is further configured to:
identify a first category of the images in the first raw-image set corresponding to the first level and a second category of the images in the first raw-image set corresponding to the second level; and
in obtaining the second raw-image set, obtain raw images from among the plurality of raw images corresponding to the first category but not to the second category.

3. The electronic device of claim 2, wherein each of the first category and the second category comprises identification information of objects recognized from the plurality of raw images based at least on the image recognition.

4. The electronic device of claim 1, wherein the category information includes identification information of at least one object recognized from the images in the first raw-image set based on the image recognition.

5. The electronic device of claim 1, wherein, in determining whether the difference satisfy the specified condition, the processor is further configured to:
obtain first data by correcting raw images in the first raw-image set using the first image correction scheme;
obtain second data by correcting the raw images in the first raw-image set using the second image correction scheme;
calculate a difference in an energy value between the first data and the second data for each of the raw images in the first raw-image set; and
classify each of the raw images in the first raw-image set into a parent group comprised of images having difference exceeding a predetermined threshold value and a subgroup comprised of images having difference lower than the predetermined threshold value,
wherein the first raw image belongs to the parent group.

6. The electronic device of claim 5, wherein the category information corresponding to the first raw image comprises a plurality of categories, and
the processor is configured to, in response to the fact that the category information on a second raw image belonging to the subgroup comprises some of the plurality of categories, obtain the second raw-image set based on at least one of the remaining categories, except for the some of the plurality of categories.

7. The electronic device of claim 5, wherein the energy value comprises at least one of brightness, color, saturation, color temperature, sharpness, color harmony, vividness, contrast, or hue saturation value (HSV).

8. The electronic device of claim 5, wherein the processor is further configured to, in response to determining that data obtained using the second image correction scheme corresponds to an expected correction result, apply a weight to a difference corresponding to the correction result.

9. The electronic device of claim 5, wherein the processor is configured to, in response to some of a plurality of pieces of metadata associated with the first raw image being associated with a second raw image belonging to the subgroup, obtain the second raw-image set based on at least one piece of the remaining metadata, except for the some of the plurality of pieces of metadata.

10. The electronic device of claim 9, wherein the plurality of pieces of metadata is obtained by an image sensor along with the first raw images and are then stored in the database.

11. An electronic device comprising:
a communication module;
a first processor configured to correct images; and
a second processor operatively connected to the communication module and the first processor,
wherein the second processor is configured to:
control the first processor to correct a first image set obtained from a database;
select at least one image from the first image set based at least on a correction result of the first image set; and
transmit feature information on the selected at least one image to the first processor, and
wherein the first processor is configured to:
obtain a second image set from the database based on the feature information; and
generate a third image set by correcting the second image set.

12. The electronic device of claim 11, wherein the first image set obtained from the database is corrected using a first correction scheme and a second correction scheme, wherein the at least one image is selected based at least on a difference between a first correction result according to the first correction scheme and a second correction result according to the second correction scheme, and
wherein the third image set is generated by correcting the second image set using the second correction scheme.

13. The electronic device of claim 11, wherein the at least one image is selected based at least on a difference between the first image set and the correction result.

14. The electronic device of claim 11, wherein the feature information comprises at least one of category information, metadata, and recipe information of the at least one image.

15. The electronic device of claim 14, wherein the category information includes a category of at least one object recognized in the at least one selected image.

16. The electronic device of claim 11, wherein the at least one image is selected based additionally on feature information of at least one other image in the first image set.

17. The electronic device of claim 16, wherein the feature information comprises at least one piece of metadata and recipe information of the at least one other image.

18. The electronic device of claim 11, wherein the database stores images received from an external device via the communication module.

19. A method for operating an electronic device, the method comprising:
identifying a database that stores a plurality of raw images received from an external device, the database comprising a plurality of category information stored in association with at least some of the plurality of raw images and determined based on image recognition of the at least some of the plurality of raw images;
identifying a change, at least in part, in an image correction scheme of the electronic device;
obtaining a first raw-image set from among the plurality of raw images, from the database;
correcting a first raw image in the first raw-image set based on a first image correction scheme to which the change has not been applied;
correcting the first raw image based on a second image correction scheme to which the change has been applied;
determining whether a difference between data obtained by correcting the first raw image based on the first image correction scheme and data obtained by correcting the first raw image based on the second image correction scheme satisfies a specified condition;
identifying category information corresponding to the first raw image based on determining that the difference satisfies the condition;
obtaining a second raw-image set from among the plurality of raw images, from the database, based on the category information; and
correcting the second raw-image set based on the second image correction scheme to generate a third raw-image set.

20. The method of claim 19, wherein the category information corresponding to the first raw image comprises a first level and a second level lower than the first level, and
wherein the obtaining of the second raw-image set further comprises:
identifying a first category of the images in the first raw-image set corresponding to the first level and a second category of the images in the first raw-image set corresponding to the second level; and obtaining raw images from among the plurality of raw images corresponding to the first category but not to the second category.

\* \* \* \* \*